United States Patent [19]

Morton

[11] Patent Number: 5,245,355
[45] Date of Patent: Sep. 14, 1993

[54] METHOD AND APPARATUS FOR GREY LEVEL PRINTING WITH AMPLITUDE AND PULSEWIDTH MODULATION

[75] Inventor: Roger A. Morton, Penfield, N.Y.

[73] Assignee: Eastman Kodak Company, Rochester, N.Y.

[21] Appl. No.: 451,907

[22] Filed: Dec. 18, 1989

[51] Int. Cl.⁵ .................... G01D 15/00; G01D 9/00; H04N 1/23

[52] U.S. Cl. ................ 346/1.1; 346/107 R; 358/298

[58] Field of Search ........... 346/107 R, 160, 154, 346/1.1, 157; 364/519; 358/298, 296, 300, 302, 455, 456, 457, 458, 459; 395/102, 108, 109, 115

[56] References Cited

U.S. PATENT DOCUMENTS

| | | | |
|---|---|---|---|
| 4,074,319 | 2/1978 | Goldschmidt et al. | |
| 4,300,142 | 11/1981 | Kos | 346/76 PH |
| 4,679,057 | 7/1987 | Hamada | 346/160 X |
| 4,746,941 | 5/1988 | Pham et al. | 364/519 |
| 4,750,010 | 6/1988 | Ayers et al. | 346/107 R |
| 4,754,291 | 6/1988 | Horikawa | 346/160 X |
| 4,768,046 | 8/1988 | Minor et al. | 346/157 X |
| 4,775,896 | 10/1988 | Umeda et al. | 358/298 |
| 4,831,395 | 5/1989 | Pham et al. | 346/160 |
| 4,835,549 | 5/1989 | Samejima et al. | 346/107 R X |
| 4,835,551 | 5/1989 | Ng | 346/108 |
| 4,837,587 | 6/1989 | Ng | 346/108 |
| 4,885,597 | 12/1989 | Tschang et al. | 364/519 |
| 4,933,686 | 6/1990 | Izumi et al. | 346/1.1 |
| 4,963,989 | 10/1990 | Morton | 358/298 |
| 4,967,192 | 10/1990 | Hirane et al. | 346/107 R X |
| 5,025,322 | 6/1991 | Ng | 358/298 |
| 5,062,002 | 10/1991 | Dahlguist | 358/298 |

OTHER PUBLICATIONS

J. P. Mentey and L. E. Rittenhouse, "Cascadeable Linear LED Array Module," *IBM Technical Disclosure Bulletin*, vol. 24, No. 10, Mar. 1982, pp. 5034–5037.

Primary Examiner—Benjamin R. Fuller
Assistant Examiner—David Yockey
Attorney, Agent, or Firm—Norman Rushefsky

[57] ABSTRACT

An improved method and apparatus for grey level printing using linear arrays of LED's or the like are described. In one embodiment, a circuit is provided that includes a look-up table that compares for each pixel to be printed a time-changing count from a threshold counter with a multibit signal representing a grey level value. In accordance with the program in the look-up table, a two-bit signal is fed to the printhead and used to turn the LED on at an intensity level commensurate with the two-bit signal. This process is repeated many times to determine the "on" time or pulsewidth of the LED for that pixel. With each repetition, a new two-bit signal is generated to define intensity level. In another embodiment, the number of repetitions of this process are shown to be substantially reducible by using a vernier clocking scheme involving a clock signal having different frequencies.

14 Claims, 14 Drawing Sheets

| COUNTER (285') | EPROM COUNT y |
|---|---|
| 0-8 | = s COUNTER |
| 9-15 | 8 |
| 16-23 | 9 |
| 24-31 | 10 |
| 32-39 | 11 |
| 40-47 | 12 |
| 48-55 | 13 |
| 56-62 | 14 |
| 63 | 15 |

LOOK UP TABLE MEMORY (225) FOR x = 18

| y | OUTPUT |
|---|---|
| 0 | 00 |
| 1 | 00 |
| 2 | 00 |
| 3 | 00 |
| 4 | 00 |
| 5 | 00 |
| 6 | 01 |
| 7 | 01 |
| 8 | 01 |
| 9 | 01 |
| 10 | 00 |
| 11 | 00 |
| 12 | 00 |
| 13 | 00 |
| 14 | 00 |
| 15 | 00 |

31.5 MHz (y = 0 to 9)
3.94 MHz (y = 10 to 15)

| PULSE WIDTH OR GREY LEVEL DATA SIGNAL "x" | EPROM (286) CODED THRESHOLD VALUE "y" | |
|---|---|---|
| | LED TURNED ON | LED TURNED OFF |
| 0 | LED NOT TURNED ON | |
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 0 | 8 |
| 9 | 7 | 9 |
| 10 | 6 | 9 |
| 11 | 5 | 9 |
| 12 | 4 | 9 |
| 13 | 3 | 9 |
| 14 | 2 | 9 |
| 15 | 1 | 9 |
| 16 | 0 | 9 |
| 17 | 7 | 10 |
| 18 | 6 | 10 |
| ⋮ | ⋮ | ⋮ |
| 61 | 2 | 15 |
| 62 | 1 | 15 |
| 63 | 0 | 15 |

FIG. 9

| PULSE WIDTH OR GREY LEVEL DATA SIGNAL "x" | THRESHOLD VALUE "y" | |
|---|---|---|
| | LED TURNED ON | LED TURNED OFF |
| ⋮ | ⋮ | ⋮ |
| 4 | 30 | 34 |
| ⋮ | ⋮ | ⋮ |
| 22 | 21 | 43 |
| ⋮ | ⋮ | ⋮ |
| 30 | 17 | 47 |
| ⋮ | ⋮ | ⋮ |

FIG. 13

METHOD AND APPARATUS FOR GREY LEVEL PRINTING WITH AMPLITUDE AND PULSEWIDTH MODULATION

CROSS REFERENCE TO RELATED APPLICATIONS

This application is related to the following U.S. applications filed on even date herewith:

1. Application Ser. No. 07/453,422 and U.S. Pat. No. 4,963,989 filed in the name of the same inventor herein and entitled, "Method and Apparatus for Grey Level Printing"

2. Application Ser. No. 07/453,421 and now U.S. Pat. No. 5,025,322 filed in the name of Yee S. Ng and entitled, "Method and Apparatus for Grey Level Recording Using Multiple Addressability"

3. Application Ser. No. 07/451,898 filed in the name of Eric Zeise and entitled, "Improved Dot Printer and Method for Grey Level Recording."

BACKGROUND OF THE INVENTION

1. Field of the Invention

The present invention relates to non-impact printing apparatus and methods for recording using light-emitting diodes or the like.

2. Brief Description of the Prior Art

In the prior art as exemplified by U.S. Pat. No. 4,831,395 printing apparatus is described which comprises a multiplicity of individually addressable and energizable point-like radiation sources, such as LED's arranged in rows for exposing points upon a photoreceptor during movement thereof relative to and in a direction normal to the rows. Driver circuits are provided for simultaneously energizing the radiation sources responsive to respective data bit input signals applied to the driver circuits during an information line period. The print or recording head includes a support upon which are mounted chips placed end to end and upon each of which are located a group of LED's. The driver circuits are incorporated in chips and located to each side of the linear array of LED chips. The driver circuits in this apparatus include a shift register for serially reading-in data-bit signals and for driving respective LED's in accordance with the data signals.

While the printing apparatus described in the aforementioned patent works well, there are limitations inherent to a binary printhead recording using one bit per picture element (pixel), i.e., an LED is either on or off for recording of an image pixel. It is also known that improved image recording obtains when recording using multibits per pixel, i.e., grey level recording of each pixel. In this regard, U.S. Pat. No. 4,074,319 describes a printhead wherein a shift register stores for each pixel to be recorded a multibit signal for recording a grey level pixel. The respective data bits are shifted to each LED in response to a shifting clock signal which may be linear or binary weighted. A problem with printheads of this type is that it may require additional data lines to the printhead which take up valuable space thereon and require additional labor for forming wire bonds on the printhead to connect these extra lines to the driver chips. Alternatively, the data may be shifted in serially until all registers are full but doing so reduces recording rates and hence productivity, since printing of a line of pixels is limited to at least the time for filling all the registers on the printhead. It is noted in U.S. Pat. No. 4,074,319 that only one bit per pixel need be stored in the shift registers on the printhead with the remaining bits stored in RAM memory. With this approach, less room is required on the printhead for data lines and less labor required for construction of the printhead. However, the use of a RAM for storage of the data requires relatively complicated circuitry for formatting the data to the printhead and for providing addressing signals to the RAM to extract the appropriate data in the proper order.

A further disadvantage of the above prior art is that recording speeds are dependent upon the exposure duration for recording grey level pixels.

In order to increase productivity, it has been proposed in U.S. Pat. No. 4,679,057 that a laser beam recording apparatus be provided with pulse-modulating input image signals wherein both amplitude and pulsewidth modulation of the image-recording beam occurs. Where multiple recording elements are present as in an LED printhead and require simultaneous energization, the problem of efficiently providing data to the printhead arises. Efficient data handling may be expressed in terms of simplicity of the printhead architecture as well as the data rates required for transmitting data to the printhead.

It is therefore an object of the invention to provide an improved printer apparatus and method of recording providing a grey level printing capability and employing a plurality of recording elements each of which is energized to produce a recording beam that is modulated in both amplitude (intensity) and duration for each recording of a picture element (pixel).

SUMMARY OF THE INVENTION

The printer apparatus and method of the invention employs a plurality of recording elements; driving means provides energy to the recording elements for simultaneously energizing selected ones of the recording elements each at one of several different possible levels of intensity; a first memory means stores for each recording element a first multibit data signal related to the driving of each recording element at the different levels of intensity so that one recording element may be energized at different intensity levels when recording different picture elements and the intensity level of the one recording element will be different than that of another recording element that is simultaneously energized; control means is provided for individually controlling the duration of the energization of each recording element during recording of a picture element so that for each recording element the duration of recording a picture element may be different than the duration of the recording of a succeeding picture element.

BRIEF DESCRIPTION OF THE DRAWINGS

FIGS. 12 and 13 are charts explaining the operation of the circuit of FIG. 5.

DESCRIPTION OF THE PREFERRED APPARATUS

The apparatus of the preferred embodiment will be described in accordance with an electrophotographic recording medium. The invention, however, is not limited to apparatus for creating images on such a medium, as other media such as photographic film etc. may also be used with the invention.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art.

Figure 1:
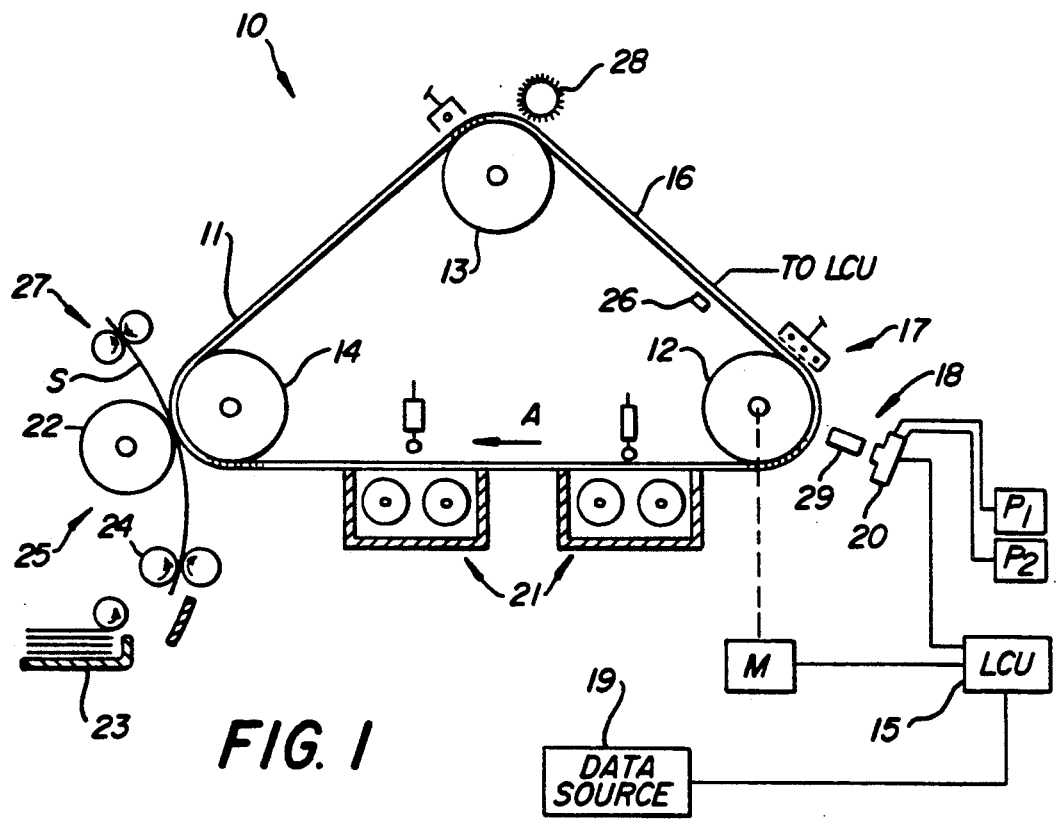
FIG. 1 is a schematic of a printer apparatus of the invention illustrating use thereof in an electrophotographic recording apparatus.

With reference now to FIG. 1, an electrophotographic reproduction apparatus 10 includes a recording medium such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a logic and control unit (LCU) 15. When the switch is closed, the roller 12 is driven by the motor M and moves the web 11 in clockwise direction as indicated by arrow A. This movement causes successive image area of the web 10 to sequentially pass a series of electrophotographic work stations of the reproduction apparatus.

For the purposes of the instant exposure, several work stations are shown along the web's path. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of picture element (pixel) sized or sub-pixel sized radiation sources in accordance with signals provided by a data source 19. The pixel or sub-pixel sized radiation sources are supported in a print head 20 to be described in more detail below. The data source 19 may comprise a computer, word processor, electronic image scanning device such as used for facsimile devices or copiers, tape reader, etc. that is coupled to the reproduction apparatus and when so combined, provides suitable signals of image information to be recorded. Where color is to be printed, the data signals will represent the appropriate signal for that color. Usually where development stations for three or more colors are provided, say in the colors cyan, magenta and yellow, the data signals may represent appropriate color separation data for a full color image to be developed.

A development station 21 includes developer which may consist of iron carrier particles and electroscopic toner particles with an electrostatic charge opposite to that of the latent electrostatic image. Developer is brushed over the photoconductive surface 16 of the web 11 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques. As may be noted in FIG. 1, more than one developer station may be provided for reproducing images in different colors. The stations are selectively activated by signals from the LCU and will carry respectively colored toner particles. Where three stations are provided carrying respective toners of cyan, magenta and yellow color, respective color separation images may be formed successively on the web 11 and transferred in superposed register in accordance with known techniques to a receiver to form a multicolor reproduction.

The apparatus 10 also includes a transfer station 25 with a transfer roller 22 or other conventional transfer charging means at which the toner image(s) on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then cause the sheet to move forward onto the web 5 in alignment with a toner image at the transfer station 25.

To coordinate operation of the various work stations 17, 18, 21, and 25 with movement of the image areas on the web 5 past these stations, the web has a plurality of index points such as perforations along one of its edges. These perforations generally are spaced equidistantly along the edge of the web 11. At a fixed location along the path of web movement, there is provided suitable means 26 for sensing web perforations. This sensing produces input signals into the LCU 15 which has a digital computer, preferably a microprocessor. The microprocessor has a stored program responsive to the input signals for sequentially actuating, then de-actuating the work stations as well as for controlling the operation of many other machine functions. Additional encoding means may be provided as known in the art for providing more precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
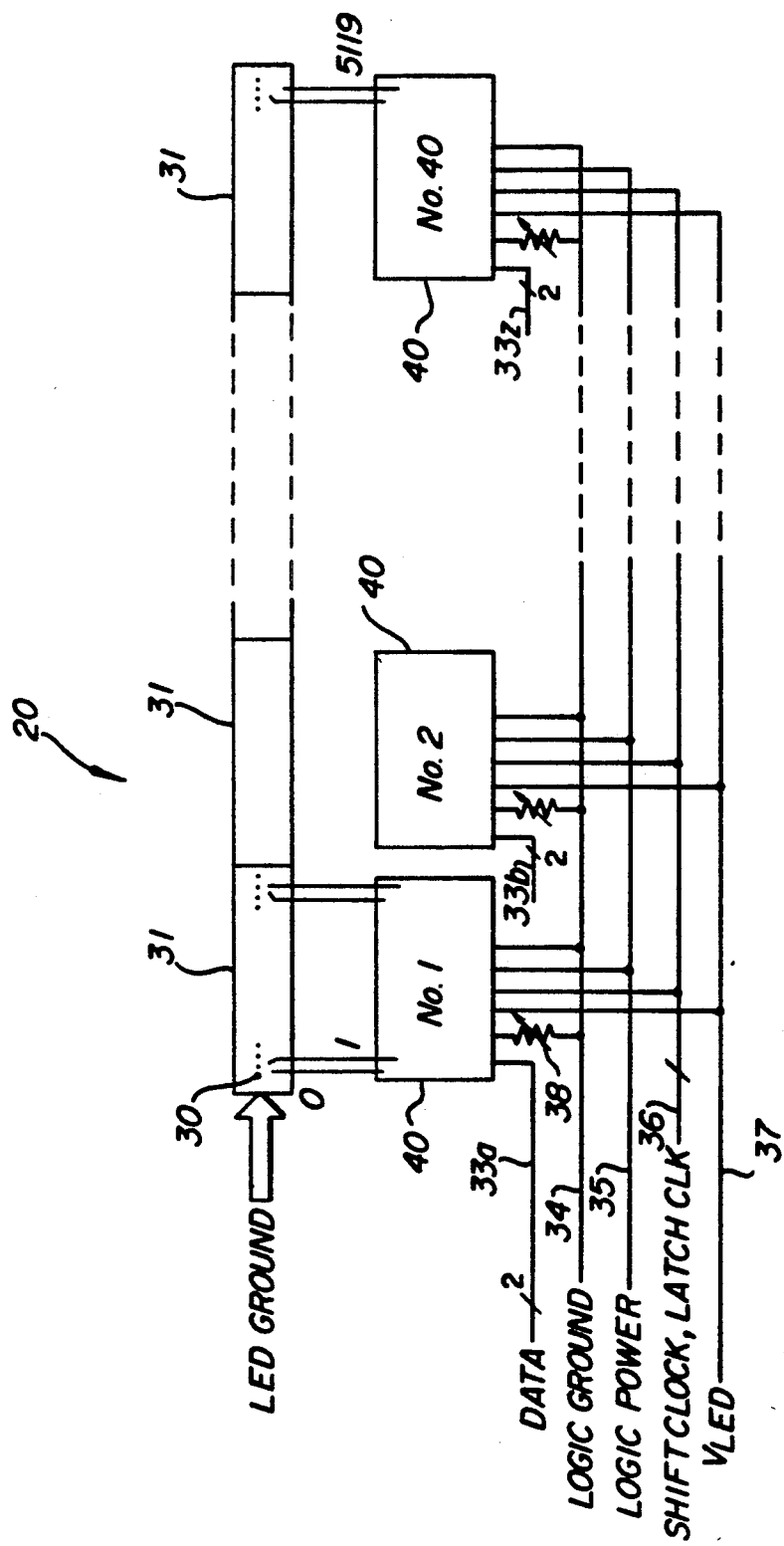
FIG. 2 is a block diagram of circuitry used in forming the printer apparatus of FIG. 1 in accordance with the invention.

With reference to FIGS. 1 and 2, the print head 20, as noted, is provided with a multiplicity of energizable pixel or sub-pixel sized radiation sources 30, preferably light-emitting diodes (LED's). It is preferred that the LED's each be shaped rectangularly or elliptically with their longer dimension arranged in the longitudinal direction of the LED chips, and at right angles to the direction of motion of the photoconductive web 1. Alternatively, the images of the LED's may be made rectangular or elliptical using suitable optical devices. Optical means 29 may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means 29, a row of emitters will be imaged on a respective transverse line on the recording medium.

With reference to FIG. 2, the print head 20 comprises a suitable support with a series of LED chips 31 mounted thereon. Each of the chips 31 includes in this example 128 LED's arranged in a single row. Chips 31 are also arranged end-to-end in a row and where 40 LED chips are so arranged, the printhead will extend across the width of the web 11 and include in this example 5120 LED's (numbered from 0 to 5119) arranged in a single row. To one side of this row of LED's there are provided forty identical driver chips 40. Each of these driver chips include circuitry for addressing the logic associated with each of 128 LED's to control whether or not an LED should be energized as well as to determine the level of current to the LED's controlled by that driver chip 40. The driver chips 40 are electrically connected in parallel to a plurality of lines 34–37 providing various electrical control signals; in this regard, see aforementioned U.S. Pat. No. 4,831,395. These lines provide electrical energy for operating the various logic devices and current drivers in accordance with their voltage requirements. A series of lines 36 (indicated by a single line in FIG. 2) provide current control, latch and clock signals and other pulses for controlling the movement of data to the LED's. As may be noted in FIG. 2, external to each driver chip 40 is a variable resistor 38 that is schematically illustrated and is further described in greater detail in U.S. Pat. No. 4,831,395. An alternative scheme providing improved digital control for driving the LED's is described in U.S. application Ser. No. 07/290,012, U.S. Pat No. 4,885,597, filed in the name of Tschang et al. Respective data lines 33a–33z (forty pairs of lines) may also be provided to each driver chip for providing a two-bit binary data signal.

Figure 3:
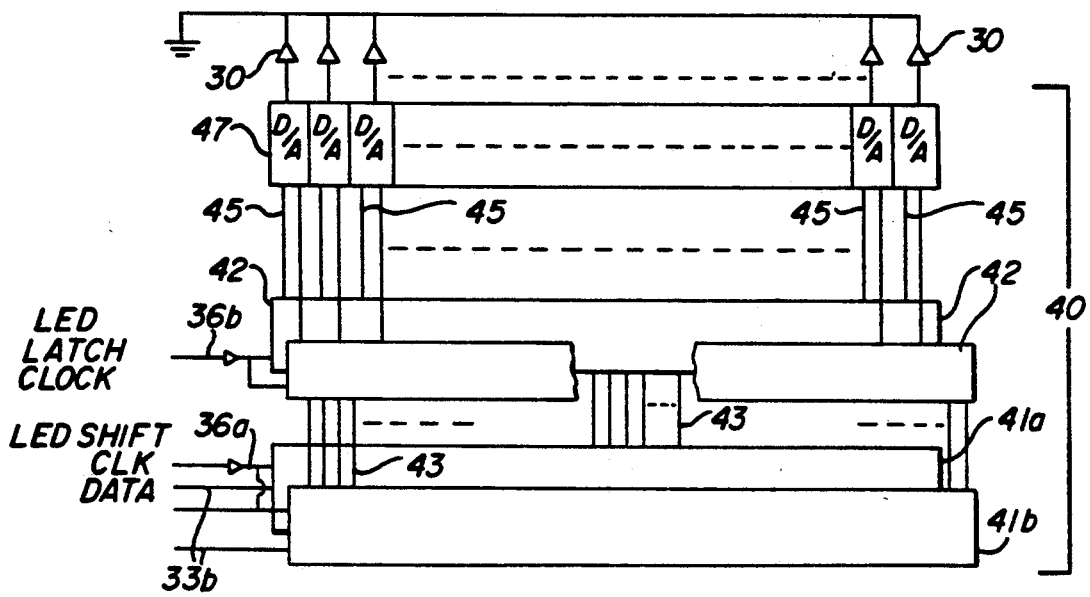
FIG. 3 is a block diagram of a driver circuit for use in the printer apparatus of FIG. 2.

With reference now also to FIG. 3, the architecture for each driver chip 40 includes two 128 two-bit shift registers 41a and 41b. As an example, driver chip #2 of FIG. 2 is illustrated in more detail in FIG. 3. Data in the form of a two-bit binary signal flows down the shift registers 41a and 41b from left to right as shown in FIG. 3. Data thus enters shift register 41a over 33a, and 41b over line 33b through the driver chip's data-in port at the left from a data preprocessing circuit to be described. In operation, for each sub-line of image to be exposed in the main scanning direction, i.e., transverse to that of movement of the recording medium 11, data from the data preprocessor to be described streams serially through each shift register under control of clock pulses provided by the LCU over line 36a. When 128×2 bits of data (1's or 0's) are stored by each pair of shift registers and 5120×2 bits of data by the shift registers of all of the driver chips, a latch signal is provided over lines 36b to latch this data into two-bit latch registers 42 so that the shift registers 41a and 41b may commence filling with data signals for the next sub-line of exposure. One hundred twenty-eight latch registers 42 are provided in each driver chip to receive the data shifted out in parallel fashion from the shift registers 41a and 41b. Each latch register is associated with a particular LED, which in turn is driven by a respective two-bit digital to analog (D/A) driver 47. The D/A driver receives the two-bit data signal and in response thereto generates a driver current to the LED that is related to the two-bit data signal, corresponding for example to the LED off, and ⅓, ⅔ and full "on" conditions of the LED. In addition, the LED's may be triggered using known encoder pulses so that they turn on in relation to the position of the recording medium. Alternatively, the presence of a signal in the latch register will itself cause the LED to be driven into conduction and turn on.

Figure 4A:
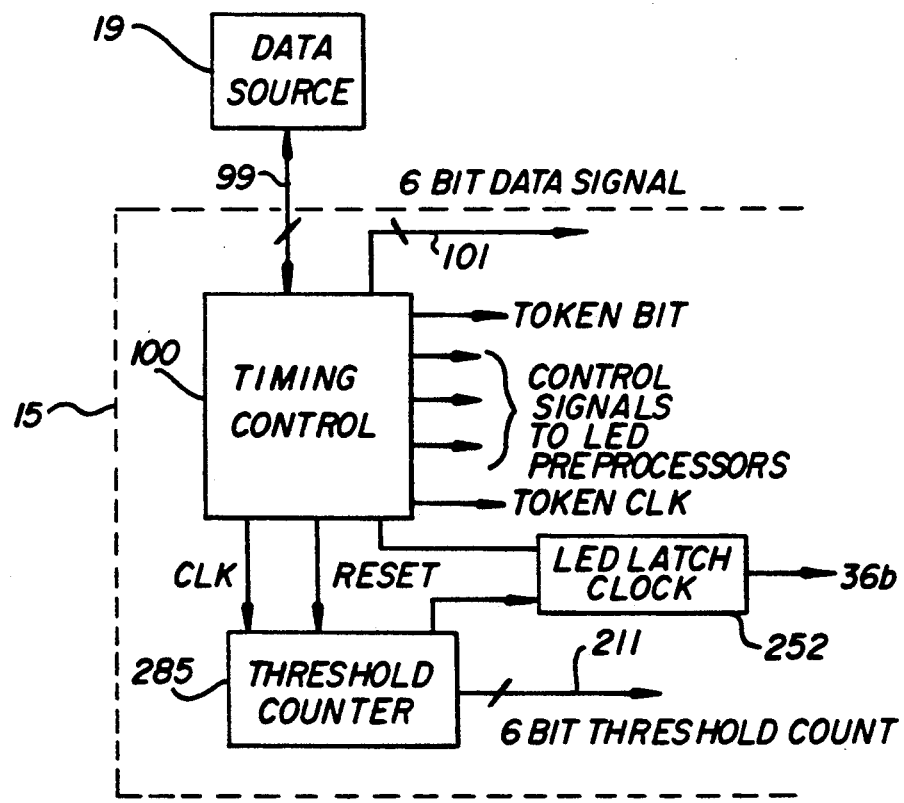
FIGS. 4A and 4B are a schematic in block diagram form illustrating one embodiment of a circuit for processing signals for the printer apparatus head illustrated in FIGS. 1-3.
Figure 4B:
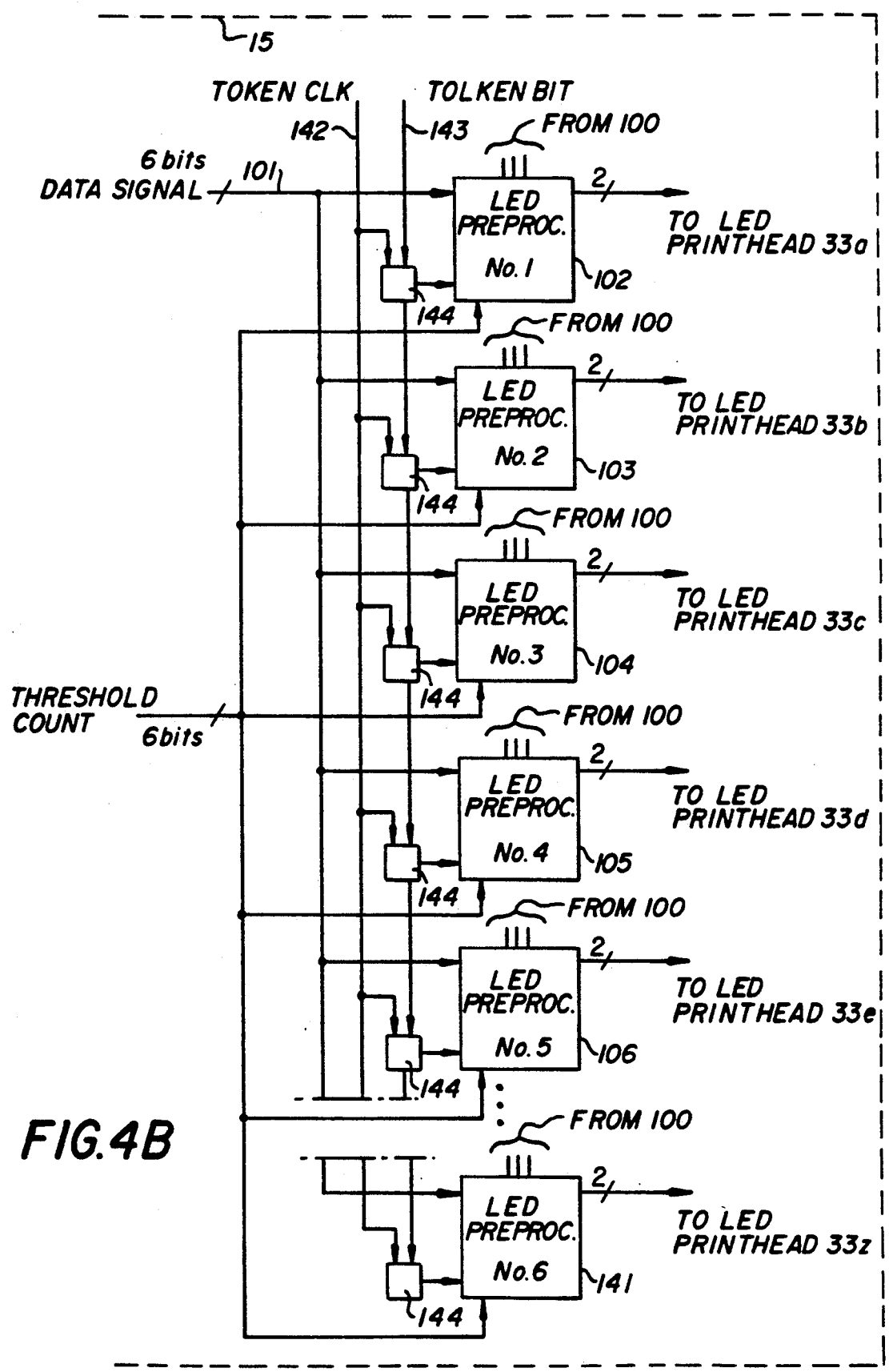
Figure 5:
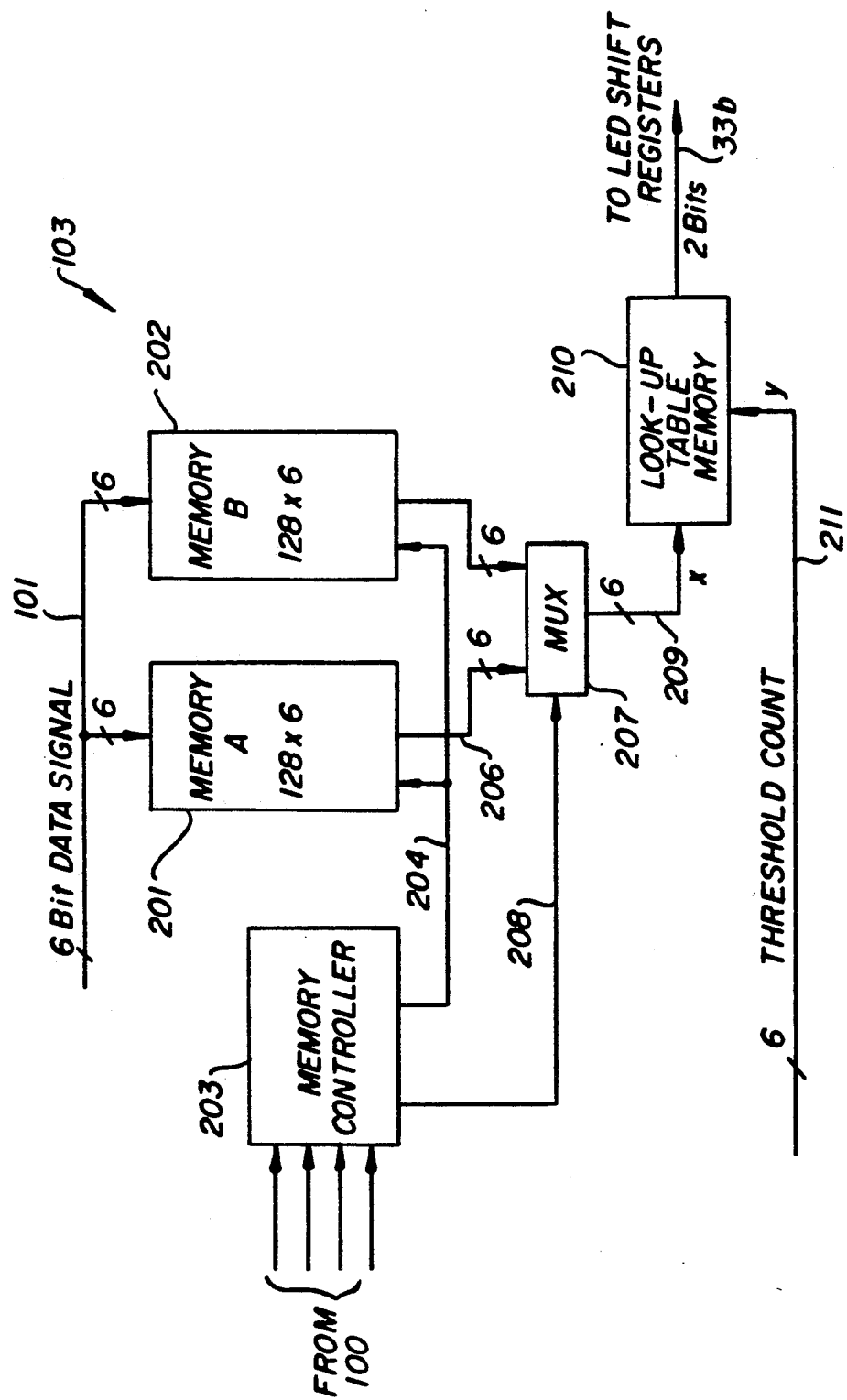
FIG. 5 is schematic in block diagram form illustrating in more detail one of the LED data preprocessing circuits of FIG. 4B.

FIGS. 4A and 4B illustrate one embodiment of logic and control circuit 15 (LCU) for preprocessing the data for sending same to the driver chips on the LED printhead. The data source 19 generates synchronously a multibit data and control signal to a timing control device 100 forming a part of the LCU 15. The control device 100 outputs in response on lines 101 (comprising six lines) a signal of six bits of data representing 64 shades of grey or shades of intensity of a particular color 1n the case of a color system. Alternatively, this six bits of data may represent a combination of grey level and correction information; in this regard reference is made to U.S. application Ser. No. 07/290,002, in the name of Pham et al. This data enters synchronously into an array of LED preprocessing circuits 102, 103 through to 141 (FIG. 4B). While there are only six preprocessing circuits illustrated to process data to the LED's, the apparatus may include, for example, forty such circuits. It will however be appreciated that data rate may be traded off against number of circuits depending on the specific application and integrated circuit characteristics. The preprocessor adapts the grey level data for serial shifting to the printhead of FIGS. 2 and 3. The six-bit video signal enters, for example, at a rate of 20 megapixels per second. The data on lines 101, enters synchronously with a token bit clocking signal which comprises one of the control signals on lines 142 which is fed to each of the forty LED preprocessing units. A token bit signal is shifted along line 143 to a register 144 associated with each LED preprocessor to determine which preprocessor is to receive the six-bit data signal. In this regard, reference is made to U.S. Pat. No. 4,746,941. The LED preprocessor, 103, for example, generates a two-bit binary data signal to the LED printhead driver assembly 40 illustrated in FIG. 3. The driver assembly 40 comprises an integrated circuit driver chip array 40 for selectively energizing LED's on a corresponding LED chip array 31. With reference now to FIG. 5, there is illustrated a detailed implementation of an LED preprocessor element, for example, LED preprocessor 103. The video line 101 enters the LED preprocessor and passes to the inputs of two memories 201 and 202. These memories receive the video data in such a way that where, during one line of scan, memory A is receiving data while during another line of scan, memory B receives data. The data loaded into memory A of LED preprocessor 103 corresponds to the data for printing by LED's numbered 128-255, the second 128 pixel-wide section of the data scan line. A memory controller 203 insures that only during the time that data for LED's 128-255 have their values represented on video lines 101 is memory A receiving data. The memory controller also generates address lines as well as timing lines through lines 204 to memories A and B. As FIG. 6A demonstrates, the A memories in each of the 40 LED preprocessors are loaded during a given scan line in such a way that each memory receives its appropriate grey level data for printing 128 pixels. This data is stored once in one of the 40 A memories of the LED preprocessors. For printing of the next line, the B memories are loaded with the video data in a corresponding way. This is shown diagrammatically in FIG. 6A where the time for the first line is marked $T_L$ corresponding to the time span 301 and during that time the waveform 302 designates the loading times for all the A memories. Memory B is loaded during the subsequent time period 303 and the waveform 304 designates the time at which the B memories are loaded. Specifically, memory 201 of preprocessor 103 is loaded during the time of pulse 305 and, specifically, the entire contents of memory A is read out a total of 64 times during the read A memories corresponding to pulse series 306. Thus, the entire memory of 128 six-bit words are read out so that each six-bit word is read out 64 times during the duration 303 of line $T_L$. The significance of the number 64 is that because there are 6 bits of video data per pixel representing a total of 64 different grey levels (including white), the duration that a given LED is "on" should correspond to N/63rds of the time for one line scan where N is the value of the binary of the 6 bits of binary data corresponding to the intensity of a pixel. If N equals 0 for a given pixel, the LED is not on at all during the time of that line scan and if N equals 63, the LED is on for the entire length of time of that line scan. The term "line scan" refers to the time it takes for the LED printhead to output the information corresponding to one line of data to the time it takes to output the information to the next line. This is generally the reciprocal of the number of lines output per second. Exceptions include when the time that the LED is on for full intensity printing is less than $T_L$ in order to make an additional adjustment for intensity variations in the LED's or for thermal considerations.

Figure 6A:
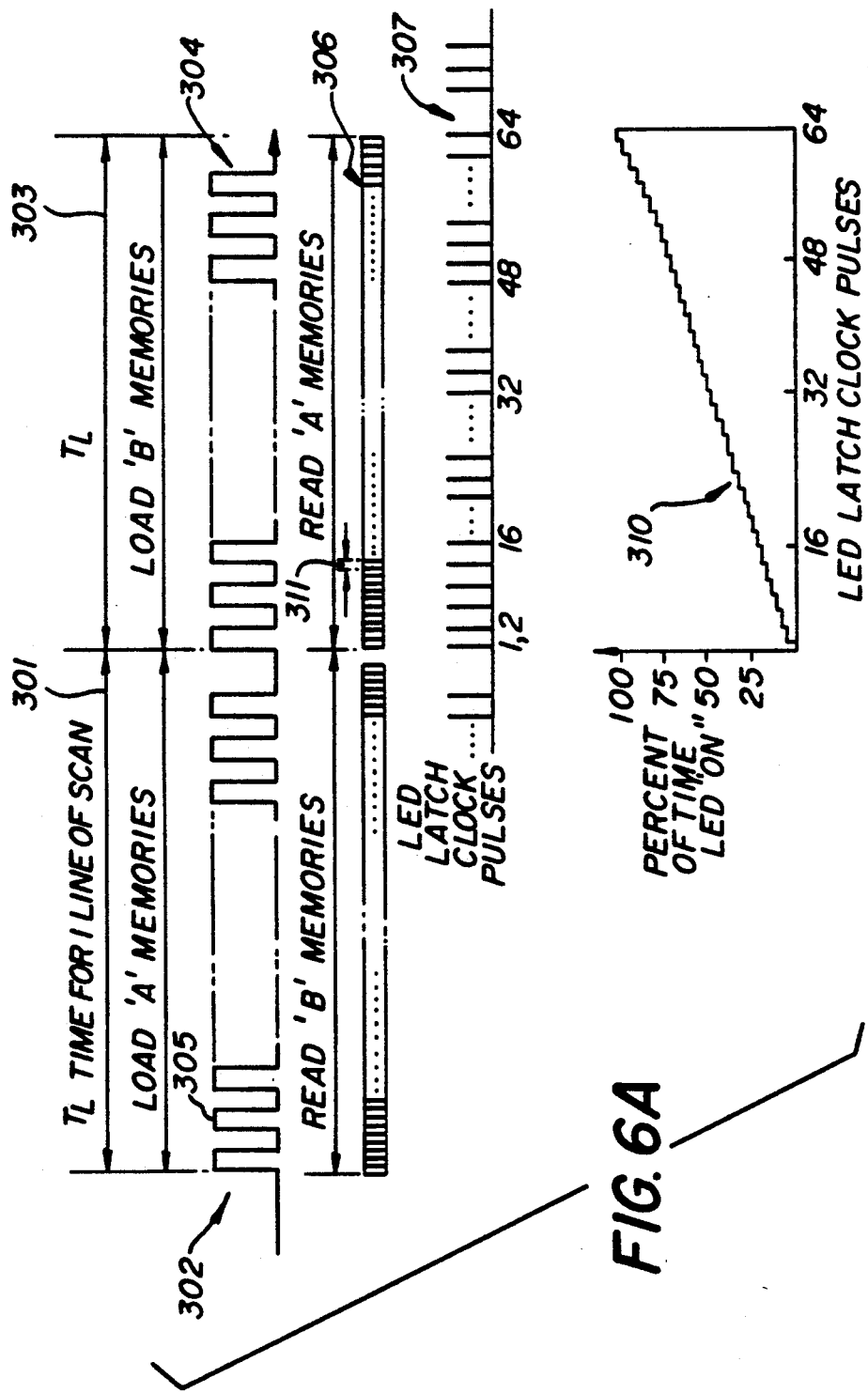
FIGS. 6A and 6B are graphs illustrating the timing of signals in the preprocessing circuit of FIGS. 4 and 5.
Figure 6B:
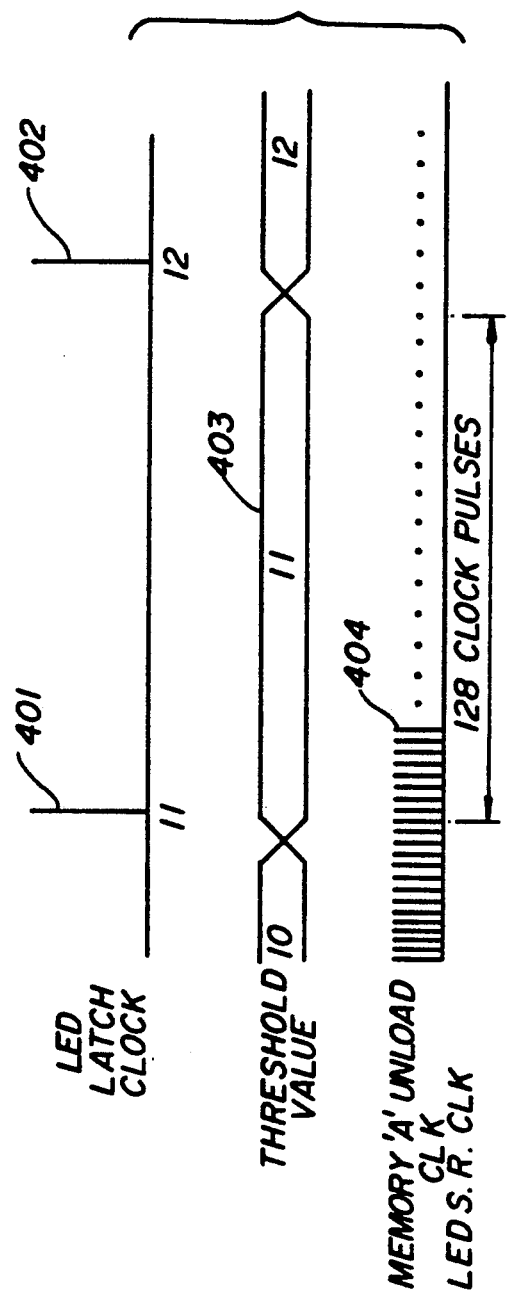

Also, shown in FIG. 6A are the pulses corresponding to the LED latch clock for the line period 303. The LED latch clock pulses 307 are used to latch data into the latch registers 42 of the LED printhead as will be described shortly. For each of the 63 times between the time for the second line of scan $T_L$, 303, all 128 words in memory A (201) are outputted sequentially through the data lines 206 to multiplexer 207 which is controlled by memory controller 203 through line 208 to pass the data to the output of multiplexer 207, then to lines 209 to be input to one terminal X of look-up table memory 210. Memory 210 compares the incoming data on lines 209 with a six-bit threshold value signal established by threshold counter 285 on lines 211 and input at terminal Y of memory 210. In accordance with a program stored in memory and as will be further described below, a two-bit data signal is generated on lines 33b that represents the intensity of a sub-pixel portion to be printed. Waveform 310 in FIG. 6A shows the value of the threshold value as a function of time during period 303. The threshold value increases from 0 to 63 changing once at each LED latch clock pulse and this is shown in more detail in FIG. 6B where the LED latch clock pulses 401 and 402 are designated as the 11th and 12th pulses from the beginning of the time for one line of scan which occurs at time 311 (FIG. 6A). Between the 11th and 12th latch pulses, the value of the threshold value on lines 211 is constant at 11 as shown in waveform 403, a changing from a 10 at the time of the LED latch clock pulse 401 and during the 12th a value of 12 at the time of LED latch clock 402. Between each LED latch clock pulse, the entire contents of memory A are unloaded consecutively and therefore 128 unload operations occur in memory A. Each unload operation being designated by a pulse 404 of the LED shift register clock and also of the memory A unload generated internally in the memory control unit 203. As each word value emerges from the memory 201, it passes through the multiplexer 207 to look-up table memory 210. In accordance with a program in the memory 210 a determination is made as to the nature of a two-bit data signal to be generated over lines 33b. In this way, a stream of data appears synchronous with the memory unload rate at 33b indicating a particular two-bit data signal to be sent to the printhead. This stream of data passes to a corresponding LED array shift register 41 (FIG. 3) on the appropriate lines 33a, 33b. . . 33z (40 lines). This stream of data appears synchronously with the LED shift register clock pulses on line 36a which in turn is synchronous with the memory a unload rate. When the 128×2 pulses have been generated to load every pixel value into the shift registers 41, the LED latch clock 252 generates a single pulse on line 36b to transfer the two-bit data signals from registers 41 over lines 43 to latch register 42. Note also that the LED latch clock pulse occurs 63 times per scan line and the time of turn on and turn off of the LED occurs at the latch clock pulse. Data transferred to the latch register provides a two-bit signal to a digital to analog converter (D/A) 47 to control whether or not the respective LED is to be "on" or "off" and if on, which of three intensity levels it is driven at. A further refinement of the preferred embodiment permits the spacing of the 63 clock pulses to give the best utilization of spacing across the tone scale from an image quality point of view. In this regard, see above-mentioned U.S. Application Ser. No. 290,002 to Pham et al, the contents of which are incorporated by this reference.

Figure 7:
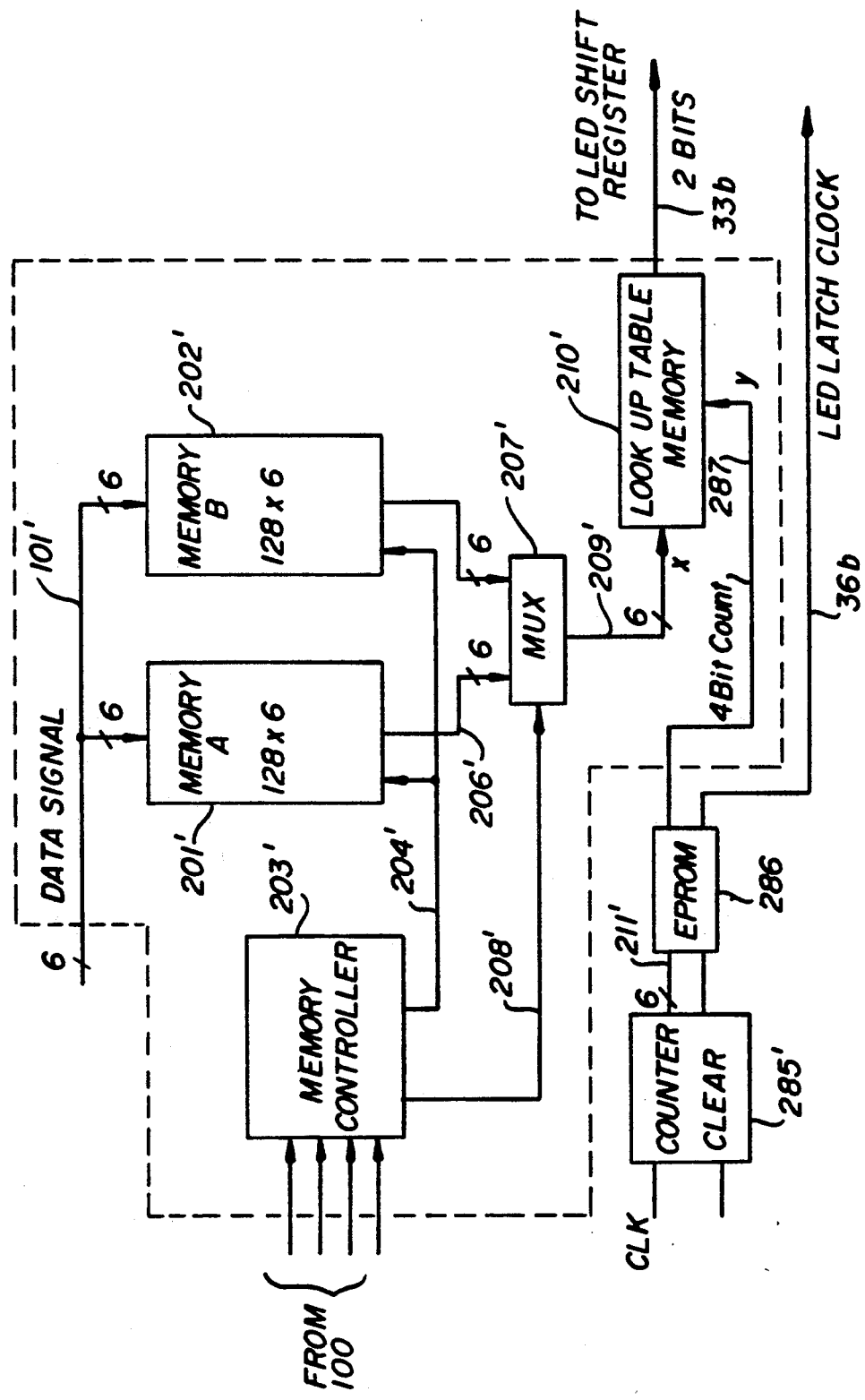
FIG. 7 is a schematic illustrating a modified processing circuit to that of FIGS. 4 and 5 to provide a vernier clocking scheme.

In order to reduce heat buildup in the printhead due to the high rate of transmission of data down in the shift register, an alternative approach is illustrated in FIG. 7 for clocking both the shift registers and the latches in the LED printhead. In this technique, instead of using 63 LED latch clockpulses during one line of scan, and unloading the memories in the LED preprocessor and loading the shift registers 41 in the driver chip assembly 63 times per line of scan, this system only requires 16 LED latch clock pulses for one line of scan. In addition, the memories in the LED preprocessor and the shift registers 41 only need to be loaded 16 times. This represents a 75% reduction in heat generation in the shift registers and memory. To accomplish this, a vernier clocking scheme will now be described. Printing using up to 64 potential pulsewidth durations, uniformly spaced in time, is still obtained even though the data is circulated through the registers one fourth as many times per scan line. Alternatively, 256 linearly spaced pulsewidth durations can be achieved using 32 clock pulses (16 coarse and 16 fine).

Figures 8A, 8B, 8C:
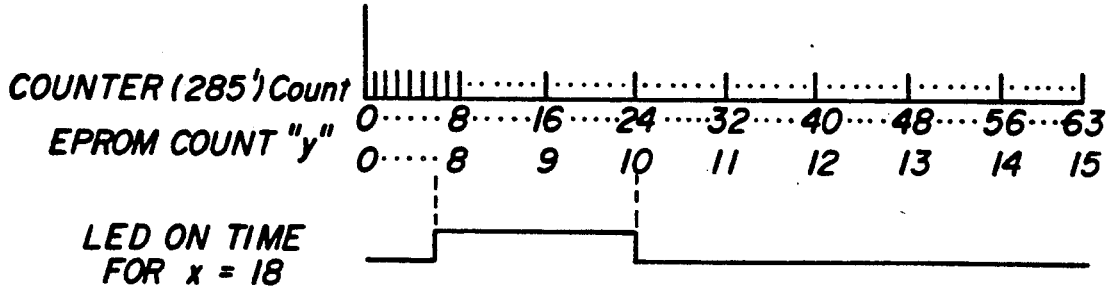
FIGS. 8A, B, C and 9 are charts and a graph illustrating the timing of signals in the data preprocessing circuit of FIG. 7.

Reference will now be made to FIG. 7, wherein similar members to those shown in FIG. 5 are denoted by a prime ('). Threshold counter 285' has its output input to an EPROM 286 or other memory. In response to the six-bit count from the threshold counter 285', a four-bit number or count is output from the EPROM on line 287. The threshold counter and EPROM thus operate as a programmed counter according to the table in FIG. 8A. Thus, where input clock pulses to the threshold counter clock change the six-bit count at the output thereof at a rate of 31.5 MHz, the four-bit output count of the EPROM changes at this rate only for its first 8 counts. Thereafter, the EPROM count remains at the level of 8 for the next 7 changes in count of the threshold counter. When the threshold counter reaches 16, the output of the four-bit EPROM count changes to 9. Upon the change of count at the output of the EPROM, an LED latch clock pulse is also generated on line 36b to shift data in the LED shift registers to the latch registers 42. As may be noted in the table 8B, the four-bit EPROM count changes at a rate of about 3.94 MHz between the counts 9 through 15. In response to each change in count of the four-bit EPROM count, the data memory, say memory A, has all 128 words read or output through the multiplexer 207' to the look-up table memory 210'. With reference now to FIGS. 8B and 8C, assume that a six-bit data word of decimal 18 is to be printed as a gray level pixel by a particular LED. This data word is present in say memory A and is cycled in its turn with the other data words 16 times to the look-up table memory 210'. For the first six times, when the EPROM count is 0,1,2,3,4 and 5, the look-up table memory outputs a "0,0" (or no print) binary signal on line 33b. Upon the seventh occurrence (EPROM four-bit count six) of the six digital bits representing decimal 18 on line 209', the look-up table memory outputs a "0,1" binary signal on line 33b. This latter signal indicates printing at the lowest level of illumination by the respective LED.

As described above for the embodiment of FIG. 5, the signals representing digital 1's and 0's are fed to the LED printhead and shifted into the serial shift registers 41 while the four-bit EPROM count remains constant. Upon change of the EPROM count, the LED latch clock pulse on line 36b causes the data to be shifted from the shift registers to the latch registers and the LED's turned on or off at the appropriate intensity in accordance with the digital signal now stored in the respective latch registers associated with a particular LED.

As may be seen from FIGS. 8B and 8C, and LED to print a pixel of grey level 18, may be turned on at EPROM four-bit count six and turned off at count 10. It may also be seen in FIG. 8C that the duration is the same as 18 count changes of the counter 285'.

In FIG. 9, a table is provided illustrating the times of LED turn on and turn off for the pulses of various width from 0 (no turn on at all) to 63 (turn on for full period of 63 counts of the threshold counter 285' or to a count of 15 from the coded or programmed counter that includes EPROM, 286. As may be seen in the table in FIG. 9, the look-up table memory 210' is coded so that when the required pulse width is 0, as defined by the grey level data signal "x", the output on line 33b is a two-bit binary signal "0,0" or the LED is not turned on. When a pulsewidth of one is called for, that is the X value on lines 209', is one, the look-up table causes the signal on line 33b to turn "on" at a count of 0 of the coded threshold value and turn "off" at a count of 1. Similarly, when a width of 2 is required, the LED turns on at a count of 0 and turns off at a count of 2. Or should be noted that in fact we could equally as well have chosen to turn the LED on at a count of 3 and turn it off at a count of 5 and some other combinations are also possible. The table follows in incremental order so that at a required width of 8, the turn "on" occurs at 0 and the turn "off" occurs at 8. Again, other combinations are also possible. While at a width of 9, the turn on occurs at 7 and turns off at a coded threshold value of 9 wherein the two clocking schemes are realized to simulate a vernier approach to clocking of the LED on times.

Thus, by suitably coding the look-up table memory 210' the conditions can be achieved by turning on and off at the appropriate values of the coded threshold. Again refer to the example in FIG. 8B and 8C where the count of width of 18 is achieved by turning on at a count of 6 a threshold value of 6 and turning off at a coded threshold value of 10. The look-up table is also programmed to provide a desired intensity level or levels when an LED is turned on for recording of a pixel, further discussion of which will be made when discussing FIGS. 12 and 13.

Figure 10:
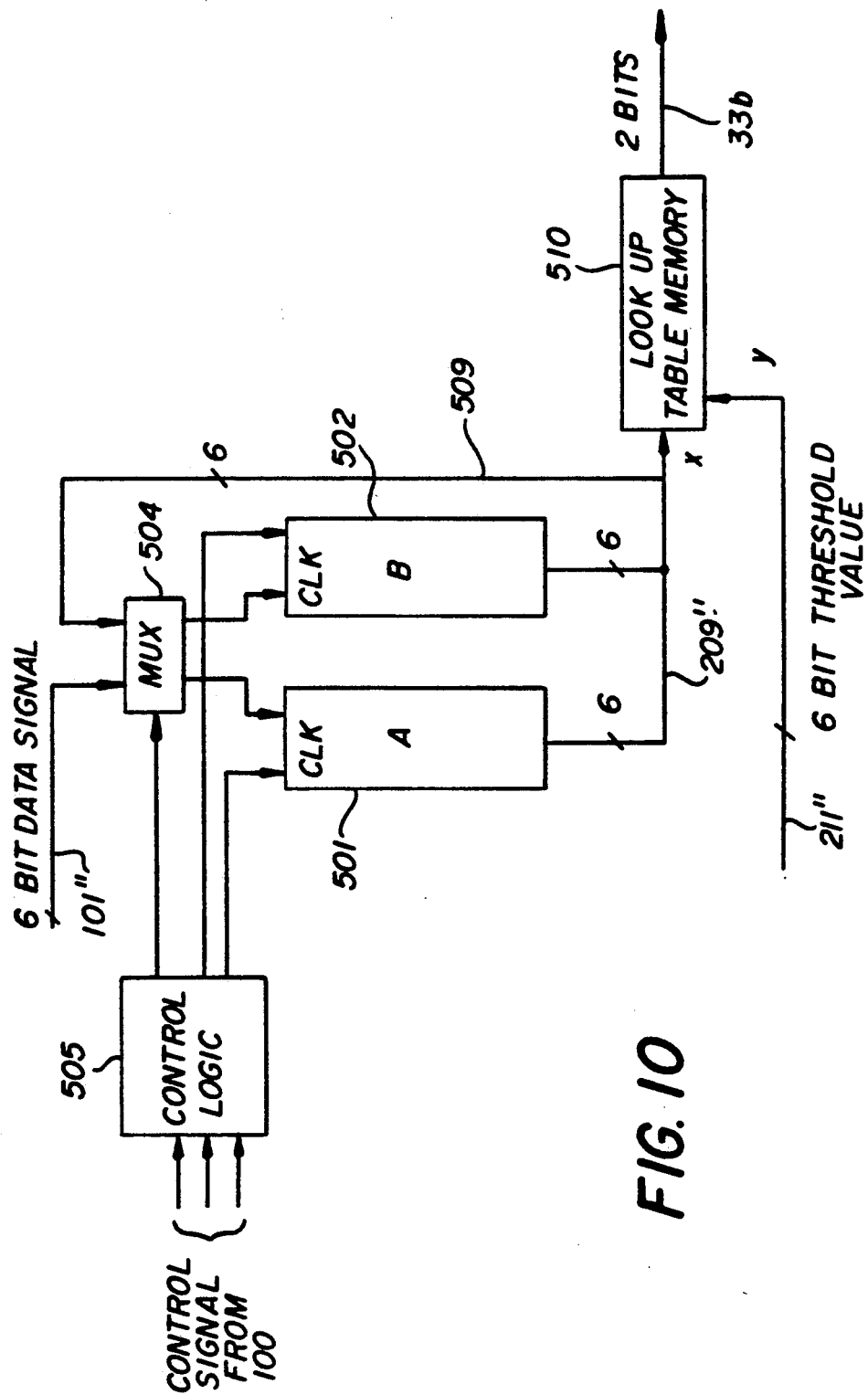
FIGS. 10-11 are schematics, illustrating still other preprocessing circuits in accordance with the invention.

FIG. 10 shows an alternate implementation of the LED preprocessor of FIG. 5 or FIG. 7 in which shift registers 501 and 502 are used in place of memories 201 and 202. Multiplexer 504 under control via signals from control logic 505 causes data to be selected from either the 6-bit data signal or the "x" data line which is to be recirculated back to the register A or B from which it originally came. Initially, the data from the 6-bit data signal line 101" is passed say to shift register A (501) using clock pulses from control logic 505. When shift register 501 is full, it is read or the data therein shifted one 6-bit word at a time onto line 209" for comparison by look-up table memory 510 with threshold signal "y" on line 211". The data on line 209" is recycled back to shift register A (501) via line 509 and through multiplexer 504 for subsequent readings. Note that while data is read from shift register A, the multiplexer 504 simultaneously provides the next line of data from the 6-bit data signal line 101" to shift register B (502). When shift register B is full and its data outputted onto line 209" (and recycled back to the shift register B), the shift register A will receive the data from line 101". The look-up table memory 510 performs the same function as look-up table memory 210 (FIG. 5) or look-up table memory 210' (FIG. 7).

Figure 11:
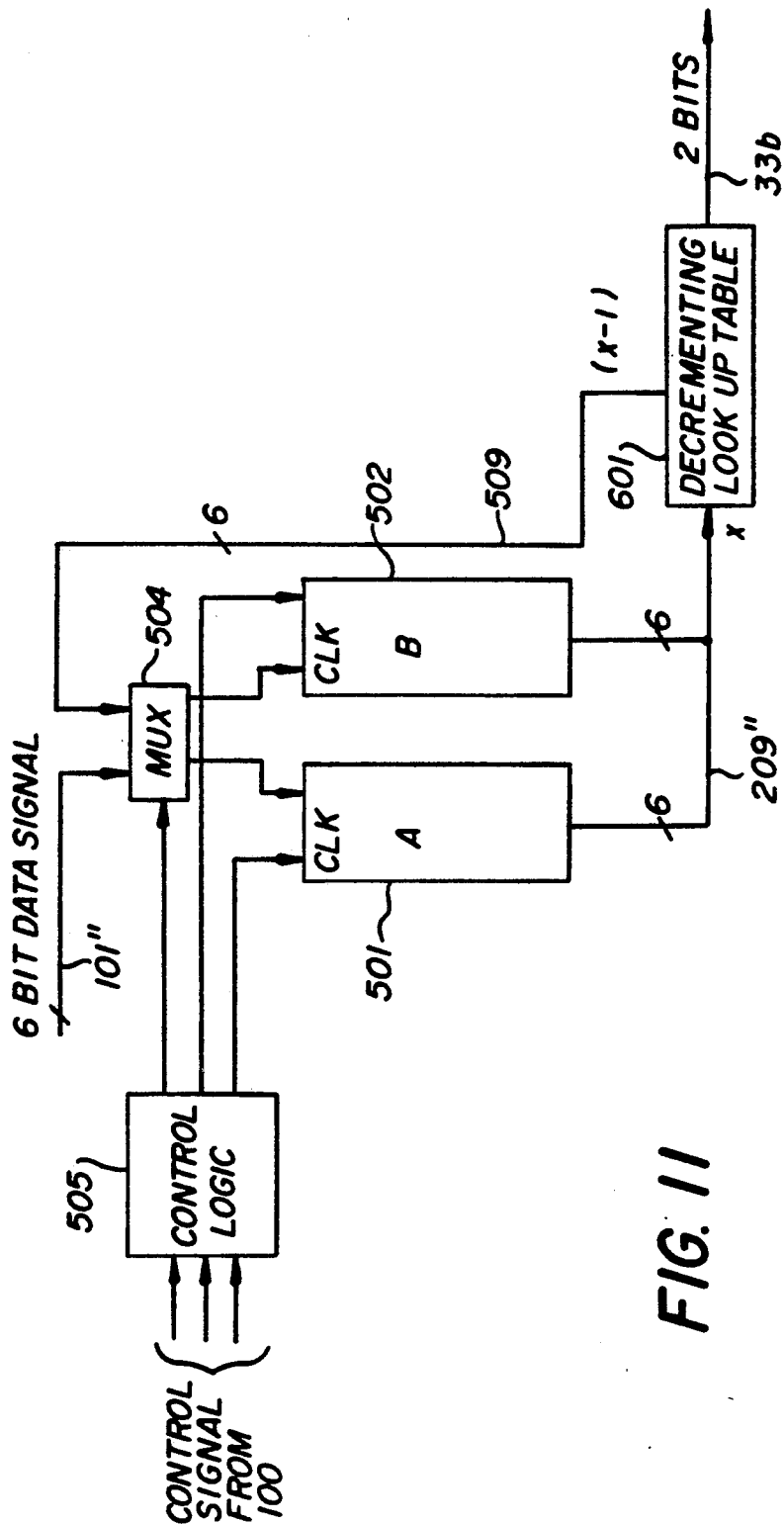

FIG. 11 shows an alternate shift register approach in which a separate threshold counter is not required; instead a combined decrementing counter and look-up table 601 receives the output x from shift registers 501 and 502 and decrements by one (x−1) the contents coming from the appropriate shift register on line 209'". The combined decrementing counter and look-up table reduces the input received on line 209" by one and returns this decremented number via line 509 to multiplexer 504 for return to the shift register A or B from which it came. If the input on line 209'" is non-zero, the look-up table generates a two-bit print signal on line 33c and generates a no print or "0,0" signal when x is "0". The multiplexer 504 feeds the decremented number back into the appropriate shift register while the control logic performs the same functions as described for the embodiment of FIG. 10 of controlling the multiplexing between the shifting of the various data signals to the appropriate shift registers A and B and providing appropriate clock signals. The look-up table may be programmed to provide high intensity print signals; i.e., "1,1" for ranges of signals on line 209" that are relatively high, i.e., for values of 50–63 the signal on line 33b may be "1,1". For X values of 20–49, "1,0" and for X values of 1–19 "0,1." Alternatively, a counter may be provided and cooperate with table 601 to adjust the intensity of the print signal in accordance with a different arrangement, i.e., the order of intensities may be changed.

Figure 12:
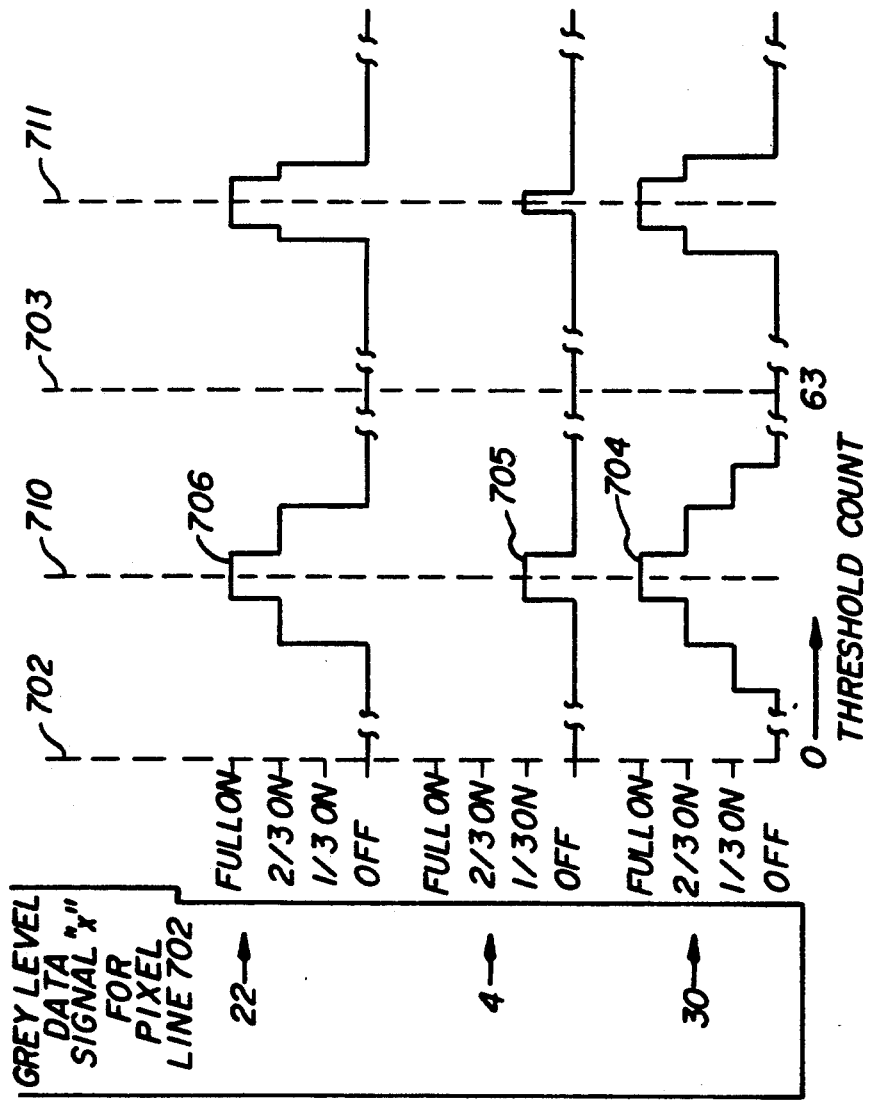

With reference to FIG. 5 and FIGS. 12 and 13, the program provided in the look-up table memory 210 enables the turn-on pulse period to be symmetrical with respect to the center of the LED turn on time thereby modifying the appearance of the image when viewed under a magnifying glass and possibly, depending on the characteristics of the electrophotographic image improving the appearance of the image and the normal viewing conditions. The look-up table 210 receives the output of multiplexer 207 on line 209 as well as receiving the threshold value on line 211 into the look-up table 210. The output of the look-up table is provided on to the line 33b and the look-up table is so coded as to produce symmetrical or at least approximately symmetrical waveforms around the center of the LED turn on time shown as line 710 and 711 in FIG. 12. For reference, the start of successive scan lines is shown as lines 702 and 703 while the waveforms 704, 705 and 706 correspond to sample outputs during which time three LEDs are respectively turned on for scan line 702. It will be understood that each LED is on for the period of time indicated and this represents the successive on periods created by the serial string of two-bit signals fed the respective latch register during a scan line. For example, the look-up table 210 may provide that for a pulse width of four threshold clock units indicated by waveform 705, the look-up table in response to a grey level signal of four on line 209 provides a "0,0" output on line 33b while the threshold count "y" on line 211 is below 30. When the count reaches 30, the look-up table provides a binary "0,1" level output on line 33b. This level is continued until the "y" count is 34 at which point the output on line 33b is made "0,0" again. Thus, the LED is driven at a ⅓ intensity level for four clock periods. Looking at waveform 706, it may be noted that for part of its on-time it is driven at a ⅓ intensity level and at a "full-on" intensity for another portion of its on-time. This is accomplished by the look-up table outputting digital level signals "1,0" for a first time period, then a "1,1" level signal for a second time period and then a "1,0" signal for a third time period. At other times, the signal will be "0,0", or no print. Description relative to center pulsewidth modulated waveforms may be found in commonly assigned U.S. Pat. No. 4,750,010.

While the embodiments described above illustrate the driver chips as being to one side of the row of LED's (see FIG. 2), it is recognized that driver chips may be located on both sides so that more convenient bonding of driver circuitry to the LED's may be provided. In addition, faster data handling is provided in this arrangement by having one driver chip handle the data and driver electronics for odd LED's of an LED chip array and the other handle the data and driver electronics for the other LED's of the same chip array; for example, see aforementioned U.S. Pat. No. 4,831,395. In another alternative, three-shift register pairs may be provided in one driver chip array and associated with each LED chip array so that one shift register pair will receive the data for LED's 1, 4, 7, 10, etc., while a second shift register pair receives the data for LED's 2, 5, 8, 11, etc., while the third shift register pair receives data for LED's 3, 6, 9 and 12, etc. A multiplexer may distribute the appropriate data to the three different shift register pairs.

Still further modifications are possible. For example, the look-up table 210 may correct for nonuniformity of the LED's. An address signal may be provided to the microcomputer to the look-up table to define the LED to which that data applies. In this regard, further description may be had to U.S. application Ser. No. 290,002, filed Dec. 27, 1988.

ADVANTAGES

There has been disclosed a grey level printhead having an efficient architecture but yet having the capability to provide exposures for pixels over a relatively great exposure range. This is accomplished using both pulsewidth and intensity modulation of the LED beam. Through varying of the intensity over multiple levels, it is possible to maintain wide exposure capability with relatively shorter exposure times.

Although the description of the invention has been made with particular reference to preferred embodiments using LED's other types of non-impact recording elements are also contemplated including laser, thermal, etc. It is to be understood that modifications and variations thereto can be effected within the scope and spirit of the invention.

What is claimed is:

1. A method of non-impact printing employing a plurality of recording elements arranged along a line for recording a line of picture elements, at least some of said picture elements have different grey level shades than others in said line of picture elements; said method comprising the steps of:

storing in memory a plurality of different first multibit signals wherein for each of said recording elements there is stored a respective first multibit data signal related to energizing of a respective recording element at one of plural different possible levels of intensity;

simultaneously energizing, in response to said respective first multibit data signals, selected ones of said recording elements each at one of the plural possible levels of intensity with at least some of said selected ones of said recording elements being energized for recording of respective picture elements in said line of picture elements at a level of intensity that is different than a level of intensity of other recording elements to record said line of picture elements with at least some of said respective picture elements having different ones of said grey level shades than others in said row;

individually controlling a duration of energization of each of said selected ones of said recording elements during recording of one of said respective picture elements having one grey level shade of said grey level shades so that the duration for recording said one of said respective picture elements is different than a duration for recording of a succeeding picture element on a succeeding line of picture elements that has a grey level shade different than said one grey level shade; and changing data in said memory during recording of one of said respective picture elements to drive said respective recording element at different levels of intensity during recording of said one of said respective picture elements.

2. The method of claim 1 and further including the steps of energizing the recording elements to expose a photosensitive member to form latent images thereon; developing respective latent images with respective differently colored toners; and transferring developed images to a receiver to form a multicolor reproduction.

3. The method of claim 1 or 2 and wherein in recording of the line of picture elements said recording elements are activated for variable pulse width modulated time periods and said time periods are generally centered relative to each other.

4. A non-impact printer apparatus comprising:
a plurality of recording elements;
first memory means for storing for each of said recording elements a respective first multibit data signal related to energizing of a respective recording element at one of plural different levels of intensity so that said respective recording element may be energized at an intensity level when recording a picture element different from an intensity level of another of said recording elements that is simultaneously energized to record a different picture element;
driving means, responsive to respective first multibit data signals, for providing energy to said recording elements to record respective picture elements in a line of picture elements, at least some of said respective picture elements having different grey level shades than others in said line of picture elements, said driving means simultaneously energizing selected ones of said recording elements with some of said respective ones of said recording elements energized at different levels of intensity than others;
control means for individually controlling a duration of energization of one recording element of said selected ones of said recording elements during recording of one of said respective picture elements so that the duration of recording said one of said respective picture elements is different than a duration of recording of a succeeding picture element by said one recording element; and
wherein the control means further includes means for changing data in said first memory means during recording of said one picture element whereby said driving means drives said one recording element at different levels of intensity during recording of said one picture element.

5. A non-impact printer apparatus comprising:
a plurality of recording elements;
first memory means for storing for each of said recording elements a respective first multibit data signal related to energization of a respective recording element at one of plural different levels of intensity so that said respective recording element may be energized at an intensity level when recording a picture element different from that of another of said recording elements that is simultaneously energized to record a different picture element;
driving means, responsive to said respective first multibit data signals, for providing energy to said recording elements to record respective picture elements in a line of picture elements, at least some of said respective picture elements having different grey level shades than others in said line of picture elements, said driving means simultaneously energizing selected ones of said recording elements with some of said selected ones of said recording elements energized at different levels of intensity than others;
control means for individually controlling a duration of energization of one recording element of said selected ones of said recording elements during recording of one of said respective picture elements so that the duration of recording said one of said respective picture elements is different than a duration of recording of a succeeding picture element by said one recording element; and
wherein the control means further includes second memory means for storing a plurality of second multibit data signals, each of said second multibit signals representing a grey level data signal for energizing a respective one of said recording elements in recording of a respective picture element, counter means for generating a multibit count signal that represents a time-changing count, and decision means responsive to one of said second multibit data signals from said second memory means and to said multibit count signal for selectively outputting one of said first multibit signals to an input of said first memory means wherein said one of said first multibit signals has fewer bits than said one of said second multibit signals.

6. The apparatus of claims 4 or 5 and wherein the control means activates the recording elements for variable pulse width modulated time periods and said time periods are generally centered relative to each other.

7. The apparatus of claims 4 or 5 and further including a photosensitive member, and wherein the recording elements are positioned to expose the photosensitive member to form latent images thereon, and including means for developing respective latent images with respective differently colored toners and means for transferring developed images to a receiver to form a multicolor reproduction.

8. The apparatus of claim 5 and wherein the control means further includes means for generating from the second memory means in sequential order a series of second multibit grey level signals and for repeating a sequence of outputs of said second multibit grey level signals.

9. The apparatus of claim 8 and wherein the counter means generates a time-changing count that changes with time nonuniformly.

10. The apparatus of claim 8 and wherein the counter means generates a time-changing count that changes each of a series of counts, first at one frequency and then at another frequency.

11. The apparatus of claim 10 and including clocking means synchronized with said time-changing count for energizing one of said recording elements so that said one of said recording elements is activated for durations related to a combination of said one frequency and said another frequency.

12. The apparatus of claim 5 and wherein the second memory means comprises shift register means for shifting a multibit signal to said decision means; and said control means includes means for recirculating said multibit signal back to said shift register means.

13. The apparatus of claim 5 and wherein said decision means comprises a look-up table memory.

14. The apparatus of claim 5 and wherein said decision means comprises means for decrementing multibit signals and further includes means for returning to said second memory means a decremented multibit signal.

* * * * *